US010121152B2

(12) United States Patent
Fordyce, III et al.

(10) Patent No.: US 10,121,152 B2
(45) Date of Patent: Nov. 6, 2018

(54) CONSUMER SPECIFIC CONDITIONAL REWARDS

(75) Inventors: Edward W. Fordyce, III, Hagerstown, IN (US); Karteek Hasmukh Patel, San Francisco, CA (US); Shaun Bodington, San Leandro, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1577 days.

(21) Appl. No.: 11/862,487

(22) Filed: Sep. 27, 2007

(65) Prior Publication Data

US 2008/0082418 A1 Apr. 3, 2008

Related U.S. Application Data

(60) Provisional application No. 60/827,679, filed on Sep. 29, 2006.

(51) Int. Cl.
*G06Q 30/02* (2012.01)

(52) U.S. Cl.
CPC ......... *G06Q 30/02* (2013.01); *G06Q 30/0207* (2013.01); *G06Q 30/0234* (2013.01)

(58) Field of Classification Search
USPC .......................................................... 705/14
See application file for complete search history.

(56) References Cited

U.S. PATENT DOCUMENTS

| | | | |
|---|---|---|---|
| 4,931,932 A | 6/1990 | Dalnekoff et al. | |
| 5,483,444 A | 1/1996 | Heintzeman et al. | |
| 5,648,647 A * | 7/1997 | Seiler | G06Q 20/3437 235/375 |
| 5,710,886 A | 1/1998 | Christensen et al. | |
| 5,884,278 A | 3/1999 | Powell | |
| 6,249,772 B1 | 6/2001 | Walker et al. | |
| 6,269,343 B1 | 7/2001 | Pallakoff | |
| 6,332,126 B1 | 12/2001 | Pierce et al. | |

(Continued)

FOREIGN PATENT DOCUMENTS

| | | |
|---|---|---|
| JP | H09138891 | 5/1997 |
| JP | 2001290991 | 10/2001 |

(Continued)

OTHER PUBLICATIONS

European Patent Application No. 07843536.9, Search Report, dated Nov. 26, 2010.

(Continued)

*Primary Examiner* — Eric R Netzloff
*Assistant Examiner* — Gautam Ubale
(74) *Attorney, Agent, or Firm* — The Webb Law Firm (57) ABSTRACT

A set of conditional rewards are associated with a consumer. Thereafter, notice of a reward is given for each of the consumer's transactions upon one of the consumer's accounts that satisfies one of the conditional rewards in the set. The set may be selected by the consumer, or by the issuer such as when the issuer uses a transaction history of purchases made on the consumer's account to determine the set of conditional rewards that would match a past purchasing trend of the consumer. A Globally Unique Identifier, unique within a plurality of transaction processing systems, can be associated with the consumer and used to match the transactions to a corresponding conditional reward.

18 Claims, 5 Drawing Sheets

(56) References Cited

U.S. PATENT DOCUMENTS

| | | | |
|---|---|---|---|
| 6,847,935 B1 | 1/2005 | Solomon et al. | |
| 6,871,183 B2 | 3/2005 | Gilday et al. | |
| 6,915,271 B1 | 7/2005 | Meyer et al. | |
| 6,996,579 B2 | 2/2006 | Leung et al. | |
| 7,072,848 B2 | 7/2006 | Boyd et al. | |
| 7,228,285 B2 | 6/2007 | Hull et al. | |
| 7,318,049 B2* | 1/2008 | Iannacci | 705/39 |
| 7,555,444 B1 | 6/2009 | Wilson et al. | |
| 8,388,440 B2* | 3/2013 | Patterson | 463/29 |
| 8,833,645 B2 | 9/2014 | Stretch et al. | |
| 2001/0039514 A1 | 11/2001 | Barenbaum et al. | |
| 2002/0002475 A1 | 1/2002 | Freedman et al. | |
| 2002/0062249 A1 | 5/2002 | Iannacci | |
| 2002/0107733 A1 | 8/2002 | Liu et al. | |
| 2002/0156749 A1 | 10/2002 | Sardy | |
| 2002/0165771 A1 | 11/2002 | Walker et al. | |
| 2002/0194069 A1 | 12/2002 | Thakur et al. | |
| 2003/0004761 A1 | 1/2003 | Lampe et al. | |
| 2003/0036929 A1 | 2/2003 | Vaughan et al. | |
| 2003/0097283 A1 | 5/2003 | Kimura et al. | |
| 2003/0101131 A1* | 5/2003 | Warren | G06Q 20/10 705/38 |
| 2003/0149602 A1 | 8/2003 | Francis | |
| 2003/0177066 A1 | 9/2003 | Zhang | |
| 2003/0225742 A1* | 12/2003 | Tenner | G06F 17/30557 |
| 2003/0229585 A1 | 12/2003 | Butler | |
| 2003/0233276 A1 | 12/2003 | Pearlman et al. | |
| 2003/0233278 A1 | 12/2003 | Marshall | |
| 2004/0024703 A1 | 2/2004 | Roskind | |
| 2004/0034564 A1 | 2/2004 | Liu et al. | |
| 2004/0158494 A1 | 8/2004 | Suthar | |
| 2004/0186773 A1 | 9/2004 | George et al. | |
| 2004/0215517 A1 | 10/2004 | Chen et al. | |
| 2005/0080726 A1* | 4/2005 | Krajewski | G06Q 20/10 705/39 |
| 2005/0114167 A1 | 5/2005 | McEvoy | |
| 2005/0189414 A1 | 9/2005 | Fano et al. | |
| 2005/0203782 A1 | 9/2005 | Smith | |
| 2005/0228719 A1 | 10/2005 | Roberts et al. | |
| 2005/0288998 A1* | 12/2005 | Verma | G06Q 20/06 705/14.35 |
| 2006/0004629 A1 | 1/2006 | Neemann et al. | |
| 2006/0053052 A1 | 3/2006 | Baggett et al. | |
| 2006/0053056 A1* | 3/2006 | Alspach-Goss | G06Q 20/10 705/14.17 |
| 2006/0118436 A1 | 6/2006 | Lapsker | |
| 2006/0208065 A1 | 9/2006 | Mendelovich et al. | |
| 2006/0259335 A1 | 11/2006 | La Macchia et al. | |
| 2006/0259364 A1 | 11/2006 | Strock et al. | |
| 2006/0289631 A1 | 12/2006 | Stretch | |
| 2007/0124209 A1 | 5/2007 | Walker et al. | |
| 2007/0136135 A1* | 6/2007 | Loeger | G06Q 30/02 705/14.17 |
| 2007/0156470 A1 | 7/2007 | Granucci et al. | |
| 2007/0260511 A1* | 11/2007 | Bender, II | G06Q 30/02 705/14.13 |
| 2007/0287413 A1* | 12/2007 | Kleitsch | H04L 12/14 455/405 |
| 2008/0071587 A1 | 3/2008 | Granucci et al. | |
| 2008/0082407 A1* | 4/2008 | Georgiadis | G06Q 30/02 705/14.11 |
| 2008/0296369 A1 | 12/2008 | Bodington et al. | |
| 2016/0343023 A1* | 11/2016 | Sorem | G06Q 30/0231 |

FOREIGN PATENT DOCUMENTS

| | | |
|---|---|---|
| JP | 2002015193 | 1/2002 |
| JP | 2002024728 | 1/2002 |
| JP | 2002074514 | 3/2002 |
| JP | 2004246918 | 9/2004 |
| KR | 1020040062121 | 7/2004 |
| KR | 1020040074765 | 8/2004 |
| KR | 1020040077077 | 9/2004 |
| WO | 2007002296 | 1/2007 |
| WO | 2008042803 | 4/2008 |
| WO | 2008067141 | 6/2008 |
| WO | 2009070463 | 6/2009 |

OTHER PUBLICATIONS

International Patent Application PCT/US07/79970, International Search Report and Written Opinion, dated Feb. 26, 2008.
International Patent Application PCT/US07/84153, International Search Report and Written Opinion, dated Mar. 13, 2008.
International Patent Application PCT/US08/83806, International Search Report and Written Opinion, dated Jul. 10, 2009.
International Patent Application PCT/US06/24317, International Search Report and Written Opinion, dated May 1, 2007.

* cited by examiner

CONSUMER SPECIFIC CONDITIONAL REWARDS

CROSS-REFERENCES TO RELATED APPLICATIONS

This non-provisional application claims priority to and the benefit of U.S. provisional patent application Ser. No. 60/827,679 (entitled "System And Method For Processing Transactions" filed Sep. 29, 2006), the entire contents of which is hereby incorporated by reference.

FIELD

The present invention generally relates to conditional rewards and more particularly, to methods, systems and apparatus for consumer specific conditional rewards within a loyalty program.

BACKGROUND

Financial institutions actively evaluate their reward services provided to their consumers to determine how best to meet their consumers' needs. In doing so, they often move consumers from one account to another account in an effort to match their consumers' life style changes. For example, upon an increase in income of a consumer that is an account holder of the financial institution, the consumer may be upgraded from a student card account having one set of conditional rewards to a gold card account having a different set of conditional rewards. Thus, financial institutions compete on how well they match their consumer's life style needs.

Historically, financial institutions have had to re-issue a new account number to the consumer when a new type or category of account is associated with the consumer. The cost of card re-issuance is expensive and is inconvenient to the consumer. For example, the change in account number results in a disjointed account history for the consumer. The consumer that has provided the consumer's account number to merchants for recurring bill payments or other convenience programs often experiences challenges when the consumer's account number is changed. Other problems can include the consumer having to re-provide the new account number to the merchants for a resetting of the consumer's bill payment profile with the issuer of the account to the consumer. Moreover, there may be a lag time between the implementation of the change in conditional rewards and the consumer's means for benefiting therefrom as the account holder goes through the process of accepting the upgrading of the type of account they are to receive, receiving the new card containing the new account number, and then activating the card with the new account number. This lag time affects the profit and loss margin for the financial institutions associated with the account. For example, even though account holder X has been upgraded from a gold card to a platinum card, until the card holder X receives and activates the new upgraded card, the consumer cannot access the new conditional rewards, resulting in a loss of business to merchants and financial institutions that lose profit from the higher fees that can be collected on the upgraded card.

Account activity has historically been processed at a Bank Identification Number (BIN) level (e.g.; switching, routing, category reporting, key processing such as card verification, personal identification number, as well as account holder authorization services). A BIN is an identifier, such as a six digit number, that represents various characteristics of an account. For example, a BIN may convey information such as: the financial institution at which an account resides, the type of the account (e.g.; consumer credit, consumer debit, gift card account, and commercial), and the account category. A plurality of accounts may have the same BIN number. Consequently, the BIN level processing occurs at an aggregate.

The BIN is also historically coupled to the conditional rewards to the consumer. For example, a BIN reflecting a gold account category may provide a gold account holder various conditional rewards for transactions on that account. These conditional rewards can be, for instance, purchase security insurance, travel accident insurance, personal identity theft coverage, road side service, concierge services, restaurant reservation priority, or an airline ticket upgrade. In contrast, a base account category would not provide the base account holder with such conditional rewards. Although the account category of an account is intended to reflect the spending nature of an account holder and encourage like spending, the account category is a coarse tool for accurately measuring consumer spending.

The aggregate nature of BIN level processing of conditional rewards hinders the targeting of appropriate account holders. A consumer can accept a grouping of conditional rewards at the aggregate level of the BIN, even though the consumer may not benefit from all of the conditional rewards within the grouping of conditional rewards. For example, a loyalty program may provide all gold level account holders having a specific BIN number access to a certain bonus-mile-to-dollar ratio. However, gold level account holder X may not be much of a traveler. Therefore, even though the gold level account holder X may be paying for the privilege of having the bonus-mile-to-dollar ratio through yearly subscription costs, the gold level account holder X is not gaining any benefit from it.

Therefore, relying on BIN to process account conditional rewards includes drawbacks such as: an account holder losing the opportunity to utilize specialized conditional rewards; an account holder needing to subscribe to multiple accounts in order to have access to a combination of conditional rewards not provided by any single account; a transaction handler or a financial institution losing the profit from higher transaction fees associated qualified conditional rewards not yet available to the account holder because the account has not been activated; or successive card issuance due to a change in the account because new account numbers may be needed for each advancement of the account holder through account categories. Moreover, key recurring relationships may be interrupted such as when bill payments and card-on-file arrangements are disrupted so as to cause the account holder to re-establish a recurring payment relationship.

SUMMARY

In one implementation, within a transaction processing system, a subset of conditional rewards from among a plurality of conditional rewards are received from a consumer, wherein each of the conditional rewards in the subset represents a value to be given to the consumer upon a satisfaction of a condition for a particular transaction conducted by the consumer upon one or more of the accounts issued by the issuer to the consumer. When a condition within the subset of conditional rewards are satisfied by a corresponding transaction upon one or more of the accounts, the consumer receives a notice of the reward.

In another implementation, a plurality of sets of conditional rewards are selected from a plurality of conditional rewards each representing a value to be given to the consumer upon a satisfaction of a condition for the transaction that the consumer has conducted upon the account. Each set of conditional rewards are associated with the corresponding respective category of a particular one of the accounts, such as a gold card account. The consumer is informed that the category of the account has changed into a new category. The consumer selects a subset of conditional rewards from among the set of conditional rewards associated with the new category of the account. A notice for each transaction upon the account that satisfies a corresponding condition that is associated with the account's new category.

In yet another implementation, a plurality of conditional rewards are derived from a frequency of past transactions on an account for an inventory within a time period, wherein the conditional rewards each representing a value to be credited to the consumer upon a satisfaction of a condition for a particular future transaction for the inventory conducted by the consumer upon the account. A notice is sent that is addressed to the consumer of each of the satisfied conditions.

In another implementation, a Globally Unique Identifier (GUID) is associated to a consumer's selection of a subset of a plurality of conditional rewards each being a value to be given to the consumer upon a satisfaction of a condition for a particular transaction conducted by the consumer upon one or more of the accounts issued by the issuer to the consumer. The GUID is also associated with identifiers respectively corresponding to the one or more accounts. Each of plurality of transactions contains sufficient information to be able to derive the GUID and the satisfaction of the condition for the particular transaction conducted by the consumer upon the one or more of the accounts issued by the issuer to the consumer. A notice of each of the satisfied conditions is sent.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

A subset of conditional rewards are obtained and associated with a consumer such that transactions of the consumer that satisfy one or more of the conditional rewards in the subset are rewarded. The subset of conditional rewards may be obtained from the consumer, such as by the consumer selecting from among a set of conditional awards received from an issuer. Alternatively, the subset of conditional rewards may be derived by the issuer through an examination of the consumer's transaction history of purchases made on accounts of the consumer such that the subset of conditional rewards matches a past purchasing trend of the consumer.

A Globally Unique Identifier that is unique within a plurality of transaction processing systems can be associated with the consumer in order to match the transactions to the conditional reward. When the GUID is used to match the consumer's transactions to corresponding conditional rewards, the consumer receives notification of the corresponding reward for each corresponding satisfied condition.

Conditional rewards may include: a percentage cash back; no preset spending limit; dining and concierge privileges; reward incentives; inquiry services; card replacement services; cash disbursement services; lost or stolen card reporting services; zero liability; auto rental collision damage waiver; roadside service or dispatch; accident insurance; emergency assistance services; lost luggage reimbursement services; purchase security; dining discounts; warranty management services; year-end summary statements; personal identity theft coverage; companion airline tickets; emergency evacuation and transportation insurance; hotel burglary coverage; emergency medical/dental coverage; price protection services; and various merchant offers. Conditional rewards may be in various genres such as sports, entertainment, music, theater, movies, lifestyle, travel, retail, and epicurean.

The conditional rewards may include usage limits for the account associated with them. For example, the account may have an alert system such that transactions that do not qualify for the conditional rewards are tracked and brought to the attention of the consumer. By way of example, an account having a parent as an account holder may have the conditional reward of 2% cash back on all purchases upon the account of the parent that do not occur at a liqueur store. The parent may have listed its child as having access to the account such that the child can purchase inventory upon the account of the parent. If the child purchases inventory upon the account of the parent at a liqueur store, the parent can receive an alert that a transaction has occurred on the account of the parent that fell outside of the conditional reward, namely the purchase at the liqueur store. Another example of the conditional reward with the usage limit may include a reward of 2% cash back for all purchases made upon the account within the United States of America. The consumer, however, may never travel outside of the United States of America. When the account is used in a purchase at a Point of Service (POS) of a merchant that is located in Pisa, Italy, the consumer that never travels outside of the United States of America can receive an alert. Consequently, the consumer may be alerted of possible fraudulent transactions.

Figure 1:
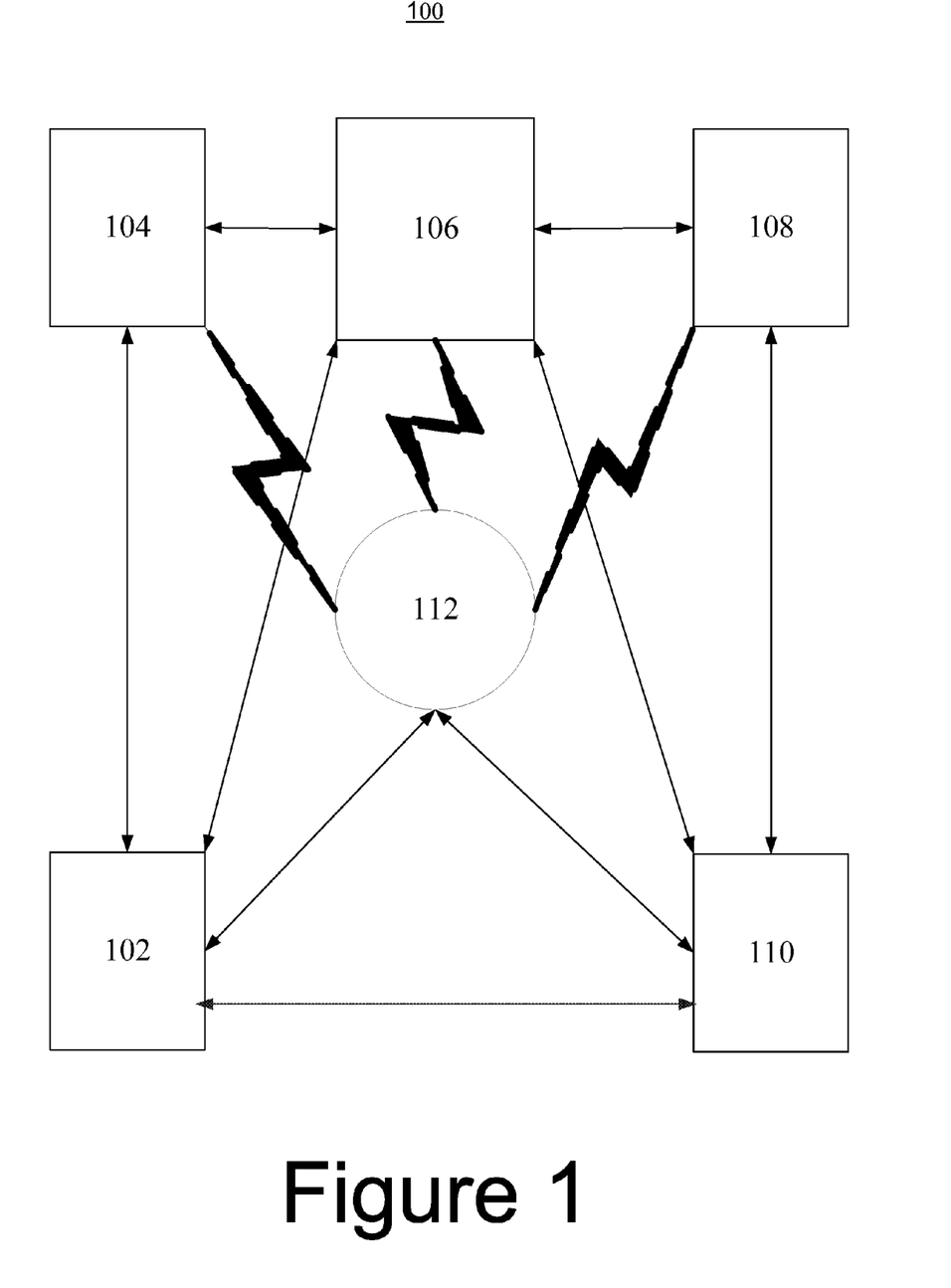
FIG. 1 is a block level diagram illustrating an exemplary transaction processing system.

As background information for the foregoing description, as will be readily understood by persons of ordinary skill in payment systems, a transaction such as a payment transaction in a payment system can include participation from different entities that are each a component of the transaction processing system. An exemplary such transaction processing system is depicted in FIG. 1 as a payment processing system 100. The payment processing system 100 includes an issuer 104; a transaction handler 106, such as a credit card company; an acquirer 108; a merchant 110; and a consumer 102. The acquirer 108 and the issuer 104 can communicate through the transaction handler 106. The merchant 110 may utilize at least one POS terminal that can communicate with the acquirer 108, the transaction handler 106, or the issuer 104. Thus, the POS terminal is in operative communication with the payment processing system 100.

Typically, a transaction begins with the consumer 102 presenting an account number such as through the use of a computer terminal or a portable consumer device 112 to the merchant 110 to initiate an exchange for a good or service. The consumer 102 may be an individual or a corporate entity. The consumer 102 may be an account holder of an account issued by the issuer 104 such as a joint account holder of the account or a person having access to the account such as an employee of a corporate entity having access to a corporate account. The portable consumer device 112 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder. The portable consumer device 112 may include a volatile or non-volatile memory to store information such as the account number or an account holder's name.

The merchant 110 may use an acceptance point device, such as a POS terminal, to obtain account information, such as an account number, from the portable consumer device 112. The portable consumer device 112 may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 104 of the portable consumer device 112. Alternatively, or in combination, the portable consumer device 112 may communicate with the issuer 104, the transaction handler 106, or the acquirer 108.

The issuer 104 may authorize the transaction using the transaction handler 106. The transaction handler 106 may also clear the transaction. Authorization includes the issuer 104, or the transaction handler 106 on behalf of the issuer 104, authorizing the transaction in connection with the issuer's 104 instructions such as through the use of business rules. The business rules could include instructions or guidelines from the transaction handler 106, the consumer 102, the merchant 110, the acquirer 108, the issuer 104, a financial institution, or combinations thereof. The transaction handler 106 may maintain a log or history of authorized transactions. Once approved, the merchant 110 can record the authorization, and allow the consumer 102 to receive the good or service.

The merchant 110 may, at discrete periods, such as the end of the day, submit a list of authorized transactions to the acquirer 108 or other components of the payment processing system 100. The transaction handler 106 may compare the submitted authorized transaction list with its own log of authorized transactions. If a match is found, the transaction handler 106 may route authorization transaction amount requests from the corresponding acquirer 108 to the corresponding issuer 104 involved in each transaction. Once the acquirer 108 receives the payment of the authorized transaction amount from the issuer 104, it can forward the payment to the merchant 110 less any transaction costs, such as fees. If the transaction involves a debit or pre-paid card, the acquirer 108 may choose not to wait for the initial payment prior to paying the merchant 110.

There may be intermittent steps in the foregoing process, some of which may occur simultaneously. For example, the acquirer 108 can initiate the clearing and settling process, which can result in payment to the acquirer 108 for the amount of the transaction. The acquirer 108 may request from the transaction handler 106 that the transaction be cleared and settled. Clearing includes the exchange of financial information between the issuer 104 and the acquirer 108 and settlement includes the exchange of funds. The transaction handler 106 can provide services in connection with settlement of the transaction. The settlement of a transaction includes depositing an amount of the transaction settlement from a settlement house, such as a settlement bank, which the transaction handler 106 typically chooses, into a clearinghouse, such as a clearing bank, that the acquirer 108 typically chooses. The issuer 104 deposits the same from a clearinghouse, such as a clearing bank, which the issuer 104 typically chooses into the settlement house. Thus, a typical transaction involves various entities to request, authorize, and fulfill processing the transaction.

Figure 2:
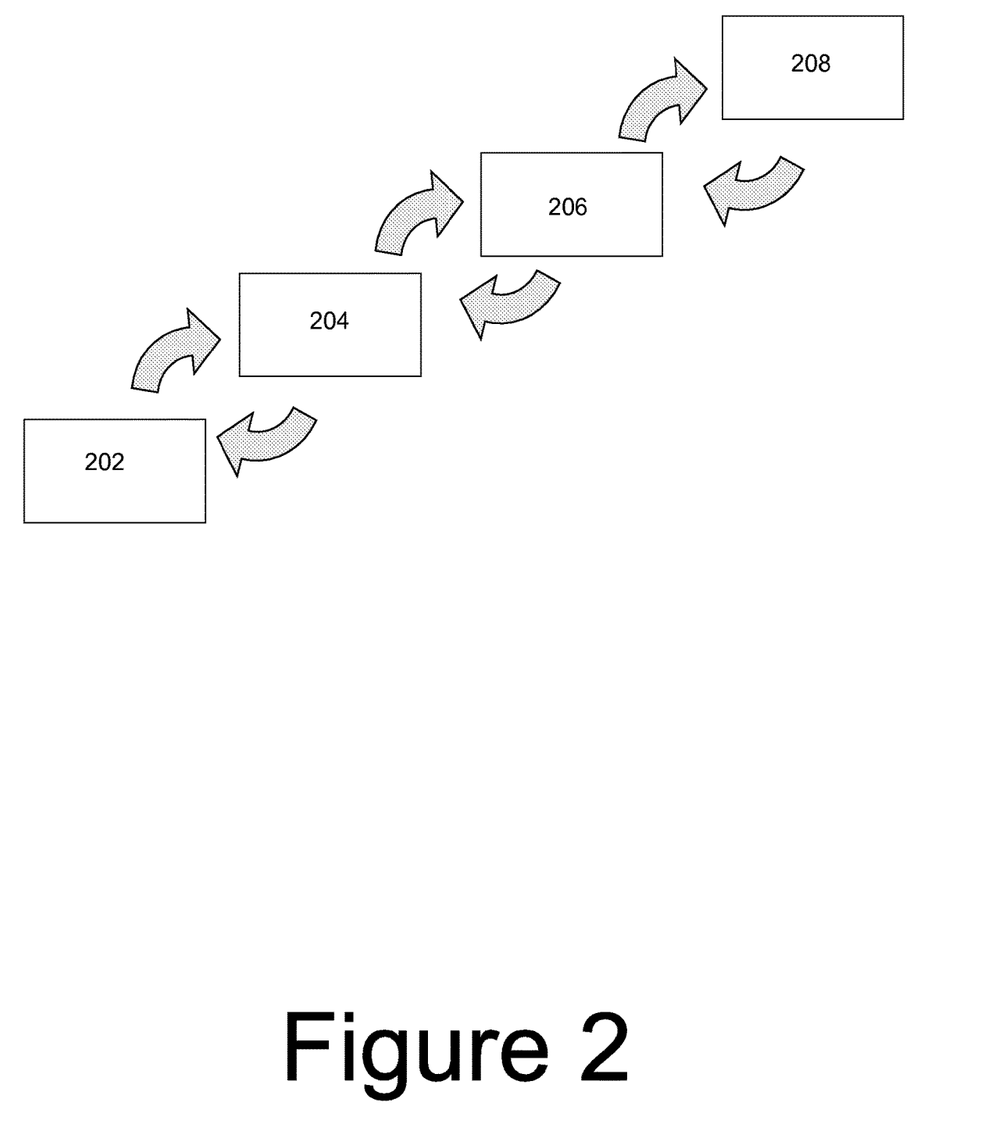
FIG. 2 is a schematic illustrating a hierarchy of account categories.

Referring to FIG. 2, a schematic illustrates a hierarchy of account categories. In one implementation, at a base level is a basic account category 202 having a first set of conditional rewards associated with it. At the other end of the spectrum is a premium account category 208 that is associated with another set of conditional rewards whose reward value is typically higher than those in the first set of conditional rewards. In between may be other account categories such as gold account category 204, and platinum account category 206 each having their own set of conditional rewards that has been pre-selected by the issuer 104. The consumer 102 may be upgrade, such as from the base account category 202 to the gold account category 204, or downgraded, such as from the platinum account category 206 to the gold account category 204. The upgrading or downgrading need not be in a lock step manner, rather, the consumer 102 may be upgraded from the base account category 202 to the premium account category 208 directly without having to go through the gold or platinum account categories 204 or 206 respectively.

The categories of a particular account can be based on at least one characteristic of the particular account. For example, the issuer 104 may offer the consumer 102 a change in the account category of the account of the consumer 102 based on any of: the frequency of the transactions upon the account within a time period (e.g.; an upgrade to the gold account category 204 when the consumer 102 spends over $1000 per month on the account); risk analysis of the probability of the consumer 102 reneging on making future payments toward future transactions conducted on the account based on the frequency of successful settlement of payments of past transactions on the account (e.g.; a downgrade to the base account category 202 when the consumer 102 has not made payments toward the balance of a credit account in the gold account category 204 for the past five months); or an analysis of inventory purchased in past transactions on the account (e.g.; an upgrade to the premium account category 208 when the consumer 102 has made five purchases of luxury items on the account in the past two months). The account category may be based on other characteristics such as whether the account is: a credit account; a debit account; a charge account; a prepaid account; a reloadable account; or a commercial account. For example, the issuer 104 may categorize a credit account that is frequently used for luxury items over $1000 differently from a gift card account frequently used for luxury items over $1000.

Figure 3:
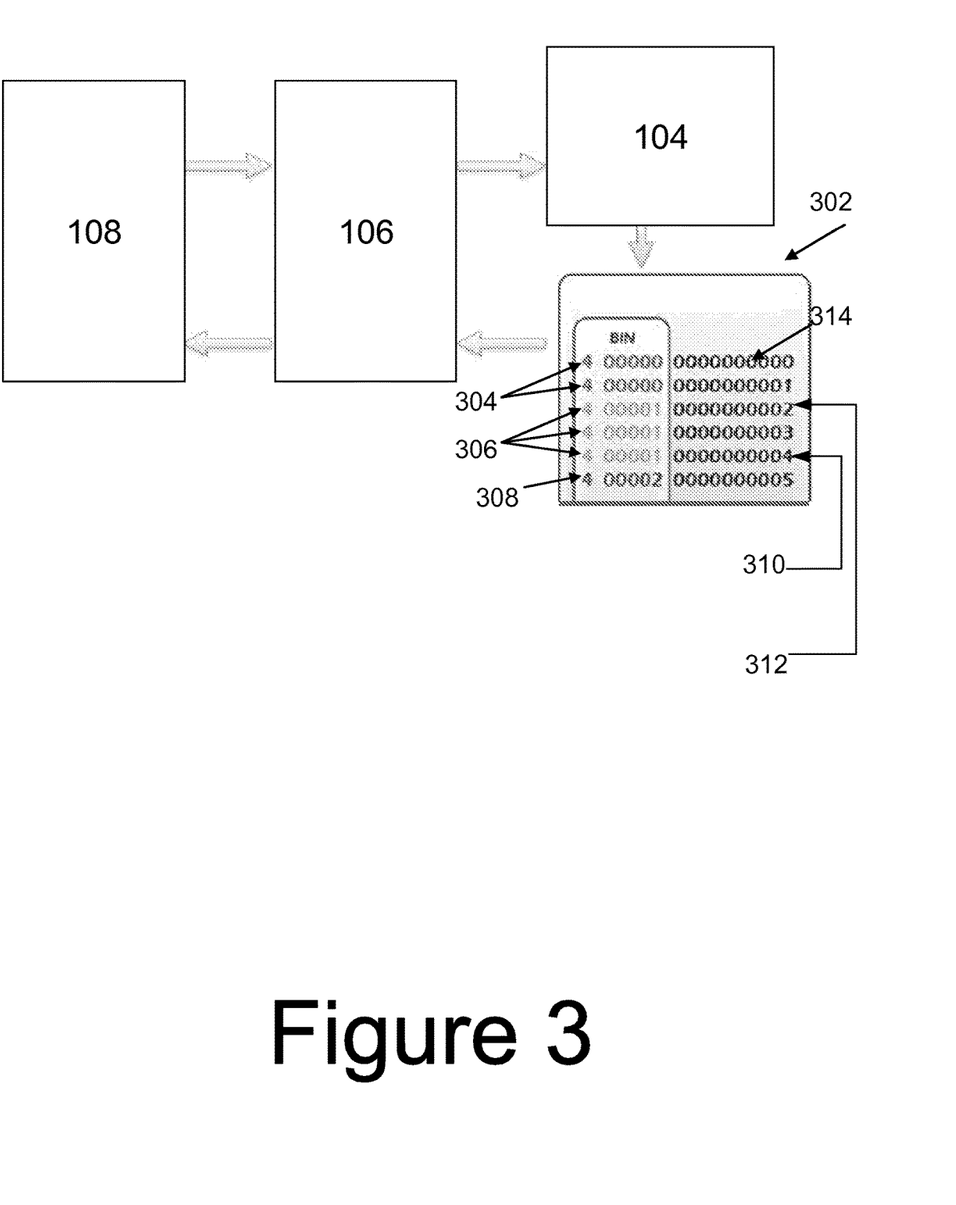
FIG. 3 is a schematic illustrating an exemplary processing of conditional rewards within the environment of FIG. 1.

FIG. 3 is a schematic illustrates processing of conditional rewards within the environment of FIG. 1. Accounts issued by the issuer 104 may be categorized into account categories. As stated previously, these account categories have historically been identified using the BIN number of the account. For example, the issuer 104 may send to the transaction handler 106 a data file 302. The data file 302 may list unique identifiers of accounts of a plurality of the consumers 102 indicating that transactions made upon each of the accounts having the same BIN may satisfy each of a set of conditional rewards that are associated with the corresponding account category. Consequently, a group of accounts 304 may be associated with the base account category 202, a group of accounts 306 may be associated with the gold account category 204, and the group of accounts 308 may be associated with the premium account category 208. During a transaction between the consumer 102 and the merchant 110, the BIN may be transmitted from the merchant 110 to the acquirer 108, to the transaction handler 106. The BIN in the transaction may be matched to the BIN of the consumer's 102 account category to determine the conditional rewards that the consumer 102 may be eligible for, such as a 5% cash back conditional reward when purchases are made upon any of the accounts in the group of accounts 304 in the basic account category 202.

Implementations process conditional rewards at the consumer level. In one implementation, the conditional rewards can be processing at a consumer level wherein a subset of conditional rewards are associated with a single account of the consumer 102. For example, an account 310 of the consumer 102 may be processed separately from an account 312 of another consumer 102 even though both the account 310 and the account 312 have the same BIN number "400001." The consumer 102 with the account 312 may have chosen the subset of conditional rewards from a set of conditional rewards received from the issuer 104. The consumer 102 may have submitted the subset of conditional rewards to the issuer 104.

The issuer 104 may, in turn, associate the subset of conditional rewards to the account 312. The issuer 104 may send to the transaction handler 106 the data file 302 listing the unique identifiers of the plurality of accounts. The data file 302 may include the account 310 and the associated respective subset of conditional rewards (not shown) chosen by the corresponding respective consumers 102.

During a transaction between the consumer 102 and the merchant 110, the unique identifier of the account 310 may be transmitted from the merchant 110 to the acquirer 108 who in turn forwards the unique identifier of the account 310 to the transaction handler 106. The transaction handler 106 may match the unique identifier of the account 310 in the transaction to the consumer's 102 selected subset of conditional rewards that were associated with the account 310. The transaction handler 106 can then determine that the consumer 102 should get the matching rewards, for instance, a 5% cash back conditional reward on the transaction upon the account 310 submitted from the merchant 110. As such, the reward is given even though the other accounts in the group of accounts 306 belonging to the other consumers 102 are not eligible for the 5% cash back conditional reward. Thus, multiple accounts with the same BIN number may have different conditional rewards associated with each of the multiple accounts because the conditional rewards are processed at the consumer level.

Two accounts with different BINs may have the same conditional reward. For example, although the account 310 may be associated with the unique identifier "400001000000004" and an account 314 may be associated with the unique identifier "400000000000000" such that each unique identifier has different BINs ("400001" and "400000" respectively) each of the accounts can have the same conditional reward associated with it (e.g.; cash back percentage of 2% with each purchase on each of the accounts). Thus, multiple accounts with the different BIN number may have the same conditional reward associated with each of the multiple accounts because the conditional rewards are processed at the consumer level.

In another implementation, the conditional rewards can be processed at the consumer level where the subset of conditional rewards are associated with a plurality of account issued by the issuer 104 to the consumer 102. The consumer 102 may have multiple accounts (e.g.; a debit account, a credit account, and a gift card account) issued by the same issuer 104. The consumer 102 may select a subset of conditional rewards that are associated with each of the multiple accounts issued by the same issuer 104 such that a transaction on any of the multiple accounts issued by the same issuer 104 can satisfy the conditional reward of the set of conditional rewards. For example, the consumer 102 may select the conditional reward that gives a free trip to Bermuda with the purchase of five tickets to Bermuda made payable on either the debit account, the credit account, or the gift card account issued to the consumer 102 by the issuer 104.

A globally unique identifier (GUID) for the consumer 102 can be associated with the consumer 102 that is also associated with each of the multiple accounts issued by the same issuer 104. In the previous example, the transaction handler 106 may utilize the consumer 102's GUID to determine whether the consumer purchased tickets to Bermuda on the consumer 102's account. For each such purchase as determined from that consumer 102's GUID, the purchase is counted towards the consumer 102's 'five tickets to Bermuda' condition in order to be rewarded with the free ticket to Bermuda.

The issuer 104 may have received the GUID from the transaction handler 106. Alternatively, the issuer 104 may have derived the GUID from a predetermined algorithm, or a combination the forgoing. For example, the transaction handler 106 may have instructed a first issuer 104 to associate GUIDs having "01" as leading numbers within each of the GUIDs that the first issuer 104 will associate with the consumers 102 having accounts with the first issuer 104. The transaction handler 106 may also instruct a second issuer 104 to associate GUIDs having "22" as leading numbers within each of the GUIDs that the second issuer 104 will associate with the consumers 102 having accounts with the second issuer 104.

Alternatively, or in combination, the GUID may be derived. For example, the GUID may be derived using any of the unique identifiers for at least one of the consumer's accounts as input to an algorithm. In one implementation, the unique identifier for at least one of the accounts is a hash of the GUID.

The plurality of accounts issued by the issuer 104 to the consumer 102 that are associated with the subset of conditional rewards may each be valid during the same window of time. For example, the consumer 102 may have two credit accounts, a debit, and a Flexible Spending Account (FSA), all of which are valid and associated with the subset of conditional rewards during the window of time from Jul. 1, 2007 to Jul. 1, 2008.

Alternatively, a single account of the plurality of accounts may exclusively be valid during a window of time such that each of the plurality of accounts is successively valid in a chronologically serial fashion. To illustrate, the consumer 102 may have a first account that is exclusively valid from Jul. 1, 1963 to Jul. 1, 1967 and a second account that is exclusively valid from Jul. 1, 1967 to Jul. 1, 2018.

The plurality of accounts issued by the issuer 104 to the consumer 102 may have features that are shared among the plurality of accounts. For example, the consumer 102 may have set up an automatic bill payment profile with the issuer 104 that includes instructions to automatically and periodically pay a payment respectively corresponding to a periodic transaction periodically conducted by the consumer 102 with one of the merchants 110 upon a valid account of the plurality of accounts. The payment amount for each automatically payment can be input intermittently. Consequently, in the case where the single account of the plurality of accounts is exclusively valid during a window of time, the consumer 102 need not reenter the instructions for the automatic bill payment when one account is invalidated and the new account is validated.

The subset of conditional rewards may change without changing either the unique identifier of the account, the GUID associated with the account, or the account itself. For example, the consumer 102 may have an account with the unique identifier "4000001234567890." The consumer 102 may select a second set of the conditional rewards. The issuer 104 may then substitute the first set of conditional rewards with the second set of conditional rewards such that the transactions made on the account with the unique identifier "4000001234567890" are evaluated based on the second set of conditional rewards.

The consumer level processing of conditional rewards enable the issuer 104 to maintain an uninterrupted relationship with their consumers 102 as the events of the consumer's 102 live changes and as the consumer upgrades (or downgrades) through levels of account categories with changing conditional rewards that meet the consumer's 102 changing needs. For example, the unique identifier of the account can be disassociated from a first account having a first account category and associated with a second account having the new upgraded account category. Similarly, the GUID of the consumer 102 can be disassociated from the first account that was categorized in a first account category and associated with the second account that has the new upgraded account category. To illustrate, the consumer 102 may have a first account that is in the basic account category 202. The consumer 102 may be upgraded to a second account that is in the gold account category 204. The second account may have the unique account identifier of the first account associated with, such as having the same account number.

The portable consumer device 112 for the first account and the portable consumer device 112 for the second account may be configured to provide the GUID, such as the unique account identifier "1234567890123456." For example, the consumer 102 may: choose a subset of conditional rewards from among a set of conditional rewards the consumer 102 received from the issuer 104, such as a set of conditional rewards that are associated with the gold account category 204; receive the first portable consumer device 112 that is associated with the first account having the account number "1234567890123456" embossed thereunto; conduct transactions using the first portable consumer device 112; receive notice of each satisfied condition within the chosen subset of conditional rewards; choose a second subset of conditional rewards from among a second set of conditional rewards the consumer 102 received from the issuer 104, such as a set of conditional rewards that are associated with the premium account category 208; continue conducting transactions upon the first portable consumer device 112; receive notice of each satisfied condition within the second chosen subset of conditional rewards for the continued transactions conducted upon the first portable consumer device 112; receive and activate the second portable consumer device 112 having the account number "1234567890123456" embossed thereunto that is associated with the second account at which time the issuer 104 inactivates (e.g.; causes to be invalid for further transactions) the first portable consumer device 112. Consequently, the consumer 102 need not wait until a new card arrives to have access to the benefits of the new conditional rewards.

The second portable consumer device 112 may have a different expiration date in order to distinguish it from the first portable consumer device 112. For example, the consumer 102 may have a gold card within the gold account category 204 with the unique account identifier "1234567890123456." The consumer 102 may be upgraded to a premium card within the premium account category 208. The consumer 102 may use the gold card and still receive the rewards from the second subset of conditional rewards selected from the set of the conditional rewards for the premium account category 208. When the premium card arrives, the premium card may have the same account number (e.g.; "1234567890123456") but a different expiration date. The premium card can thereby be distinguished from the gold card and the gold card can be invalidated such that transactions on the gold card will not satisfy any condition of any of the conditional rewards within the second subset of conditional rewards regardless of the expiration date listed on the gold card. In this manner, duplicative cards that function with one unique account identifier will not exist past a short period of time.

The processing of the conditional reward at the BIN level may coexist with the processing of the conditional reward at the consumer level. Some conditional rewards may still be triggered through a BIN level application (e.g.; interchange fees and category reporting) while other conditional rewards, such as airline travel points, may be linked to the consumer level. Moreover, a trigger can be set to toggle between the different levels of processing. For example, a database may be used to override BIN level processing for specific unique identifiers of accounts.

Forms of account clustering other than using the BIN to cluster groups of accounts together can also co-exist with the processing of conditional reward at the consumer level. For example, an algorithm may be used to link disparate unique identifiers of accounts together that have specific conditional reward in common. For example, the unique account identifiers that have a prime number above 103 within the first three digits of the unique account identifier may be associated with a 2% cash back conditional reward. The algorithm may check for a prime number when the unique account identifier is inputted to the algorithm and output if the received unique account identifier is in the cluster of accounts that qualify for the 2% cash back conditional reward. Consequently, a plurality of accounts associated with a conditional reward can be clustered together.

Figure 4:
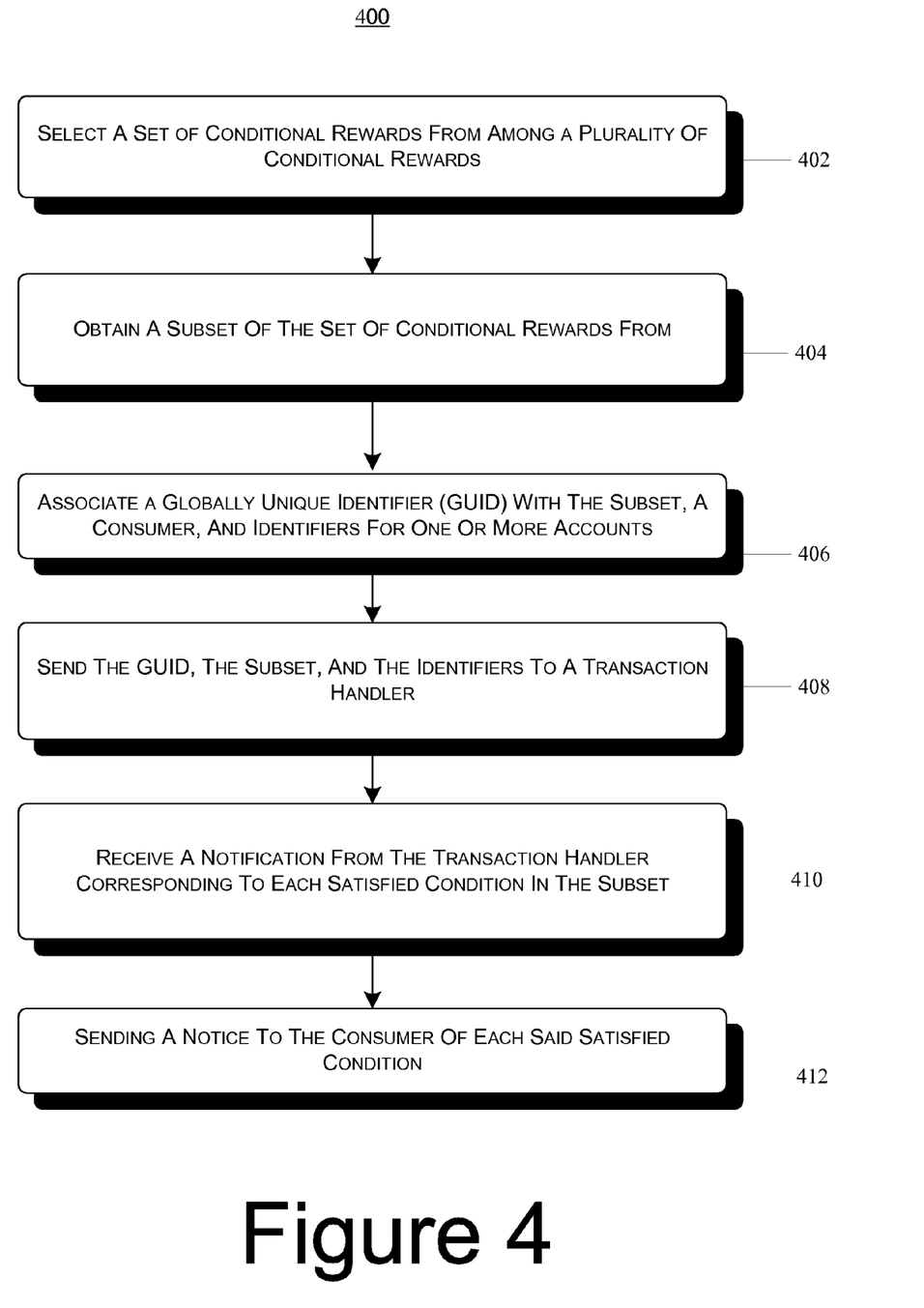
FIG. 4 illustrates a flow chart of an exemplary method for giving notice to a consumer of satisfied conditions of the conditional rewards.

Referring to FIG. 4, a flow chart of an exemplary method 400 for giving notice to the consumer 102 of a satisfied condition of the conditional rewards is illustrated. At step 402, a set of conditional rewards from among a plurality of conditional rewards is selected. For example, the issuer 104 may select the set of conditional rewards such as selecting the set of conditional rewards that the issuer 104 would like to offer the consumer 102 in association with the premium account category 208.

Alternatively, or in combination, the issuer 104 may have selected the set of conditional rewards based on a transaction history of at least one of the accounts of the consumer 102 within the transaction processing system. For example, the issuer 104 may analyze a frequency of past transactions upon at least one of the accounts of the consumer 102 for past purchases of inventory that were made by the consumer 102 within a time period. Based on the analysis of the frequency, the issuer 104 may derive (e.g., calculate, deduce, select or create) the set of conditional rewards each representing a value to be credited to the consumer 102 upon a satisfaction of a condition for a particular future transaction for the inventory that had been conducted by the consumer 102 upon the account, where the account has the set of conditional rewards associated to it. To illustrate, the consumer 102 may be an avid purchaser of fine art. Typically, the consumer 102 purchases a piece of fine art each month using cash or the consumer's 102 credit account or the consumer's 102 debit account each of which have been issued by the issuer 104. The issuer 104 may detect the purchasing trend of the consumer 102 on the credit account or the debit account and select the set of conditional rewards associated with the consumer 102 such that one of the conditional rewards gives 10% credit back to the consumer 102 on the consumer's 102 credit card statement when the consumer 102 uses the consumer's 102 credit account to purchase the fine art. Thereafter, the consumer 102 may change their purchasing behavior to avoid cash purchases of fine art in favor of purchases made with the consumer's 102 credit account or the consumer's 102 debit account.

In a commercial environment, the transaction history of the consumer 102 that is a commercial entity may be analyzed to derive a set of conditional rewards. For example, the spending limit of a small company may be tailored to the company's seasonal fluctuation in revenue stream such that the spending limit on the account of the small company is seasonally increased during the months of November to December to match the small company's need to provide for sale of an increased inventory during that window of time.

A set of conditional rewards can be derive from a transaction history of an account. For instance, the derivation can be made by (i) associating, for each of the conditional rewards, a value of a reward with a value of a good or service that had been purchased in a past transaction; (ii) associating, for each of the conditional rewards, the value of the reward with a discount on one particular future transaction for the purchase of a good or service that had been purchased in one of the past transactions; (iii) associating, for each of the conditional rewards, the value of the reward with a free good or service that had been purchased in one of the past transactions; (iv) associating, for each of the conditional rewards, the value of the reward with a discount on future travel expenses to a destination corresponding to travel expenses to the destination of one of the past transactions; (v) associating, for each of the conditional rewards, the value of the reward with a discount on a future purchase at one of the merchants 110 corresponding to a past purchase from the one of the merchants 110 of one of the past transactions; (vi) associating, for each of the conditional rewards, the value of the reward with a discount on a future purchase of a food item at one of the merchants 110 corresponding to a past purchase of the food item from the one of the merchants 110 of one of the past transactions; etc.

The transaction history of at least one of the accounts of the consumer 102 within the transaction processing system may be analyzed more than once during a time period. For example, the analysis on the frequency of past transactions can occur in the fall and also in the spring of each year. The fall analysis can be compared to the spring analysis to determine a change in purchasing behavior. A new set of conditional rewards can be selected to match the change in shopping behavior. In the example above, a repeat analysis on the transaction history of the consumer 102 that is the avid purchaser of fine art may reveal that the avid purchaser has stopped purchasing fine art in the past year but has started purchasing glass sculptures made in Murano, Italy. The issuer 104 may change the set of conditional rewards for the avid purchaser such that the conditional rewards that gave 10% credit back to the consumer 102 on purchases of fine art is substituted to a conditional reward wherein airline tickets to Murano, Italy can be purchased at half price if purchased upon the avid purchaser's credit account. Consequently, the avid purchaser would no longer receive the benefit of the conditional reward giving the 10% credit back but would receive the benefit of the half price Murano airline tickets if the corresponding condition is satisfied.

At step 404, the issuer 104 can optionally obtain a subset of the set of conditional rewards. The consumer 102 may have received the set of conditional rewards and selected therefrom the subset of conditional rewards that the consumer 102 wishes to participate in. The consumer 102 may have sent the issuer 104 the subset. For example, the consumer 102 may have received a set of 100 conditional rewards that are available within the gold account category 204. From the set of 100 conditional rewards that are available within the gold account category 204, the consumer 102 may have selected 10 that match the consumer's 102 life style, such as two-for-one rock climbing equipment when making purchases on the account within the gold account category of 204.

Alternatively, or in combination, the consumer 102 may have selected the subset from the set of conditional rewards that were derived based on the transaction history of at least one of the accounts of the consumer 102 within the transaction processing system. For example, the issuer 104 may have derived a set of conditional rewards for the avid purchaser based on the transaction history of the avid purchaser including: 10% cash back for any purchase made upon at least one of the accounts of the avid purchaser, free upgrade to first class for airline tickets purchased with the credit card of the avid purchaser, two-for-one dinner at the Four Seasons if made payable on the debit card of the avid purchaser, product insurance coverage for products purchased using a reloadable gift account of the avid purchaser, and 5% off prescriptions purchased with a Flexible Spending Account of the avid purchaser. The avid purchaser may select just the 5% off prescriptions conditional reward from the set of conditional rewards the avid purchaser received from the issuer 104.

The consumer 102 may repeat the selection of the subset of conditional rewards, such as when editing a past selected list or receiving a second set of conditional rewards from the issuer 104 from which the consumer 102 selects a second subset of conditional rewards. For example, the issue 104 may inform the consumer 102 that one of the accounts of the consumer 102 has been upgraded from the base account category 202 to the premium account category 208. The informing may include the second set of conditional rewards that are associated with the premium account category 208, from which the consumer 102 picks the second subset of conditional rewards. The second subset of conditional rewards can substitute the first subset of conditional rewards such that the transactions of the consumer 102 will be evaluated against the second subset of conditional rewards in order to determine if the transaction satisfies a condition therein.

At step 406, the GUID can be associated with: the consumer 102, the unique identifiers for each of the accounts of the consumer 102, and the subset (or set, as the case may be) of conditional rewards. For example, the issuer 104 may store the GUID, an identifier for the consumer 102 (e.g.; the name of the consumer 102), and each of the unique identifiers in a relational database such that each can be used to retrieve the other therefrom.

At step 408, the GUID, the subset (or set, as the case may be) of conditional rewards, and the unique identifiers are sent to the transaction handler 106. For example, the issuer 104 may send the GUID, the set of conditional rewards, and the unique identifier to the transaction handler 106 that utilizes each to determine whether a transaction upon one of the one or more accounts satisfies a conditional reward within the subset of conditional rewards.

At step 410, a notification corresponding to each of the satisfied conditions in the subset (or set, as the case may be) of conditional rewards is received. The issuer 104 may receive a transmission from the transaction handler 106 indicating that one of the conditional rewards has been satisfied in association with a transaction made upon at least one of the accounts. The transmission can include a description of: the conditional reward, the date of the transaction, the time of the transaction, an identifier of the merchant 110 that the transaction was conducted with, a tally on how often the condition has been satisfied within a window of time, a suggestion of other conditional rewards the consumer 102 may be interested in, or the profitability of the issuer 104 in providing the conditional reward to the consumer 102 (e.g.; fees the issuer 104 has collected within a window of time on the consumer's 102 satisfaction of the condition).

At step 412, a notice of each of the satisfied conditions is sent to the consumer 102. For example, the issuer 104 may transmit a message to the consumer's 102 cellular phone indicating that the consumer 102 has satisfied the condition of one of the conditional rewards that the consumer 102 selected from among the gold account category 204. The notice may also include instructions on how to redeem the reward such as utilizing earned points towards obtaining goods or services that are available to the consumer 102. The instructions may have a link to a website at which the goods or services are listed or means for redeeming the reward such as a web-enabled interactive session that allows the consumer 102 to book a free airline ticket to Bermuda.

Figure 5:
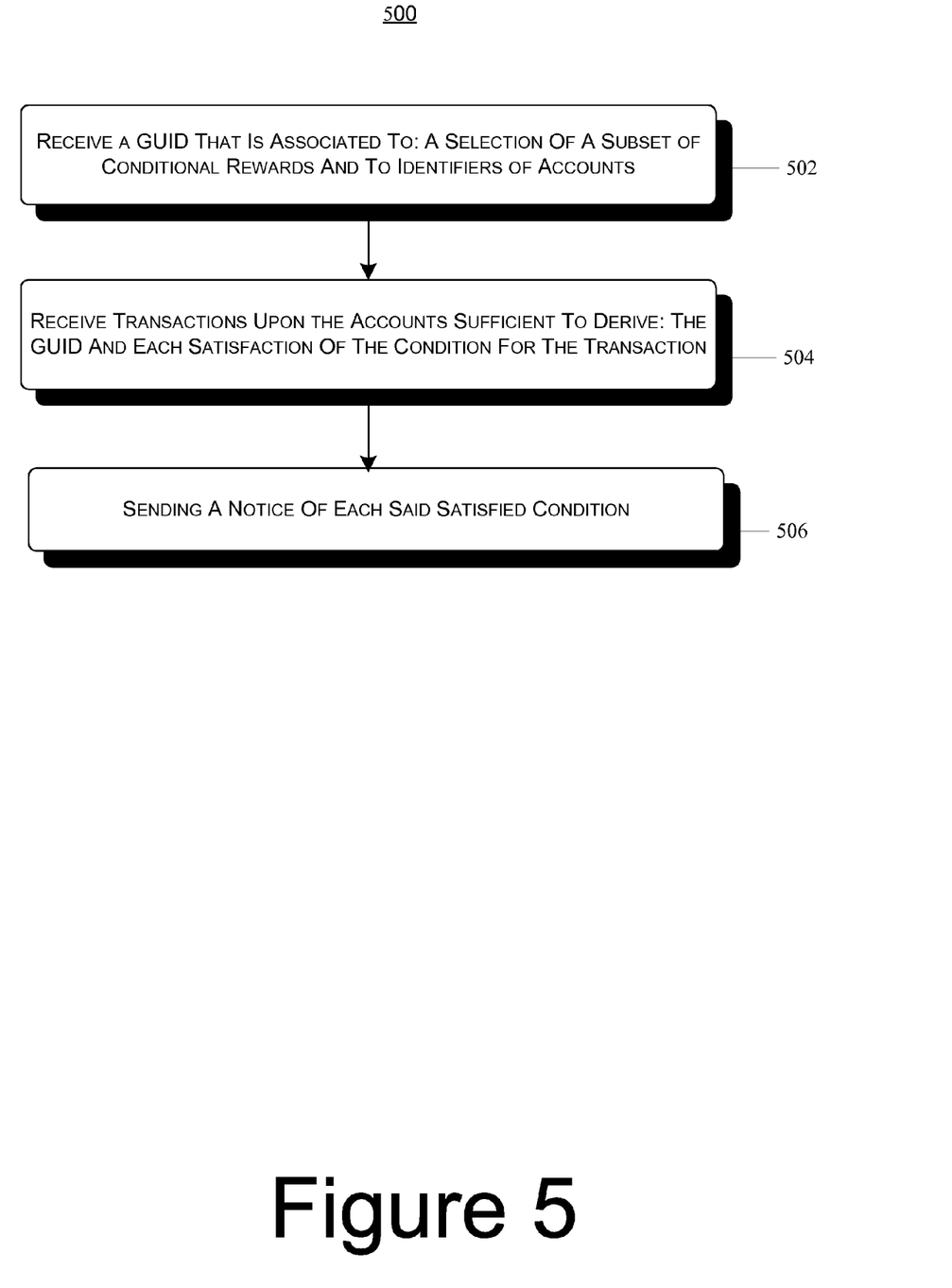
FIG. 5 illustrates a flow chart of an exemplary method for deriving the satisfied conditions of the conditional rewards.

Referring to FIG. 5, a flow chart of an exemplary method 500 for deriving the satisfied conditions of the conditional rewards is illustrated. At step 502, the GUID is received that is associated to the subset (or set, as the case may be) of conditional rewards and to the corresponding identifiers respectively corresponding to each of the at least one of the accounts of the consumer 102. For example, the transaction handler 106 can receive from the issuer 104 (i) the GUID; and (ii) the associated subset of conditional rewards. These can be stored by the transaction handler 106 in a database.

At step 504, a transaction upon at least one of the accounts is received. The data in the transaction will preferable be sufficient to derive therefrom (i) the GUID; and (ii) whether there has been an occurrence of a satisfaction for a condition for the transaction that corresponds to a conditional reward. For example, the transaction handler 106 may receive a transaction from the acquirer 108 for a transaction between the merchant 110 and the consumer 102 upon a credit account of the consumer 102. The GUID that is associated to the credit account may be the account number of the credit account or a variation or equivalent thereof. The transaction handler 106 may use the account number for a filtered search in the database storing the GUID and the corresponding subset of conditional rewards. The subset of conditional rewards corresponding to the GUID can be retrieved, such as "5% cash back if the consumer 102 uses the credit account to purchase a pharmaceutical X." To determine if the condition is satisfied, the transaction on the credit account can be matched with the conditional reward. In the case of the conditional reward of 5% cash back for a pharmaceutical X purchase, the inventory purchased on the credit account can be matched against a list of pharmaceuticals that are eligible for the conditional reward. If a match exists between the inventory purchased in the transaction and the list of pharmaceuticals that includes pharmaceutical X, then the condition is deemed to have been satisfied.

In step 506, a notice is sent for each satisfied condition. For example, the transaction handler 106 may transmit the notification to the issuer 104. Alternatively, or in combination, the transaction handler 106 may transmit the notice to the consumer 102 including the notification that the condition has been satisfied or instructions to the consumer on how to redeem the corresponding reward.

The notice may be sent to the merchant 110, such as when the conditional rewards may be redeemed at the POS of the merchant 110. For example, the issuer 104 may have developed the conditional reward in collaboration with the merchant 110. When a transaction occurs at the POS of the merchant 110, the merchant 110 may receive the notice and take action accordingly. For example, when consumer X with account number 0000001234567890 checks into a luxury hotel, the hotel can receive a message from a transaction handler 106 including the notice that the conditional reward has been earned via the satisfaction of the corresponding condition. Given the notice, the merchant 110 may offer a free upgraded room to the consumer 102 based on whether the free upgrade satisfies the condition of the conditional reward that the issuer 104 and the merchant 110 had developed collaboratively.

Various terms may be used herein, which are to be understood according to the following descriptions 1 through 8:

1. The portable consumer device 115 includes a card, smartcard, ordinary credit or debit cards (with a magnetic strip and without a microprocessor), a keychain device (such as the SPEEDPASS® commercially available from Exxon-Mobil Corporation), cellular phone, personal digital assistant (PDA), pager, payment card, security card, access card, smart media, or transponder, where each portable consumer device can include a loyalty module with a computer chip with dedicated hardware, software, embedded software, or any combination thereof that is used to perform actions associated with a loyalty program;

2. Account holder or consumer includes any person or entity with an account and/or a payment device associated with an account, where the account is within a transaction processing system;

3. Issuer includes any entity that issues one or more accounts and/or payment devices;

4. Merchant includes any entity that supports the POS device;

5. Consumers include, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

6. Redemption includes obtaining a reward using any portion of points, coupons, cash, foreign currency, gift, negotiable instruments, or securities; and 7. Reward includes any discount, credit, good, service, package, event, or experience (such as wine tasting, dining, travel).

It should be understood that the present invention can be implemented in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods to implement the present invention.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method, comprising:
sending, by a computing apparatus and to a communications device associated with a consumer, a first set of conditional rewards derived based on a transaction history of the consumer, the first set of conditional rewards associated with a first account category for a first account of the consumer;
receiving, by the computing apparatus, a first subset of conditional rewards selected by the consumer from the first set of conditional rewards;
storing, by the computing apparatus, in a database, a globally unique identifier associated with the first subset of conditional rewards, the first account of the consumer, and the first account category of the first account;
setting, by the computing apparatus, a trigger to change processing by a transaction handler from processing a conditional reward for a purchase transaction at a level of processing based on a bank identification number to processing a conditional reward for a purchase transaction based on the first subset of conditional rewards;
receiving, by the computing apparatus and via a communication network, first transaction information regarding a first purchase transaction between the consumer and a merchant conducted on the first account of the consumer using a first portable consumer device, wherein the first transaction information regarding a first purchase transaction includes the globally unique identifier associated with the first subset of conditional rewards and the first account of the consumer;
after receiving the first transaction information, accessing, by the computing apparatus, the database;
determining, by the computing apparatus and using the globally unique identifier, that the first purchase transaction satisfies a first conditional reward within the first subset of conditional rewards based on accessing the database, wherein determining that the first purchase transaction satisfies the first conditional reward within the first subset of conditional rewards comprises:
determining that the globally unique identifier included in the first transaction information regarding the first purchase transaction matches the globally unique identifier associated with the first subset of conditional rewards and the first account of the consumer stored in the database;
overriding, by the computing apparatus, processing of the first purchase transaction at the level of the bank identification number based on the trigger, the overriding comprising processing the first purchase transaction based on the first conditional reward within the first subset of conditional rewards;
automatically changing, by the computing apparatus and in the database an association of the globally unique identifier from the first account category of the first account of the consumer to a second account category of a second account of the consumer based on an analysis of past purchase transactions, accessed via the database, wherein the analysis of the past purchase transactions is performed based on transaction information regarding the past purchase transactions conducted on the first account of the consumer;
in response to changing the association of the globally unique identifier from the first account category of the first account of the consumer, automatically sending, by the computing apparatus, to the communication device associated with the consumer, a second set of conditional rewards derived based on a frequency of the past purchase transactions conducted on the first account of the consumer within a time period for a type of inventory from the merchant, wherein the second set of conditional rewards is associated with the second account category, and each of the second set of conditional rewards representing a value to be credited to the consumer upon a satisfaction of a condition for a future purchase transaction between the consumer and the merchant, wherein the future purchase transaction is to be for the type of inventory;
storing, by the computing apparatus and in the database, the globally unique identifier associated with the second set of conditional rewards, the second account of the consumer, and the second account category of the second account;
storing, by the computing apparatus and in the database, an association between the globally unique identifier, a first account identifier of the first account of the consumer associated with the first portable consumer device, and a second account identifier of the second account of the consumer associated with a second portable consumer device;
receiving, by the computing apparatus and via the communication network, second transaction information regarding a second purchase transaction between the consumer and the merchant conducted using the first portable consumer device, wherein the second transaction information regarding the second purchase transaction includes the globally unique identifier;
after receiving the second transaction information, accessing, by the computing apparatus, the database;
determining, by the computing apparatus and using the globally unique identifier, that the second purchase transaction satisfies a second conditional reward within the second set of conditional rewards based on accessing the database, wherein determining that the second purchase transaction satisfies the second conditional reward within the second set of conditional rewards comprises:

determining that the globally unique identifier included in the second transaction information regarding the second purchase transaction matches the globally unique identifier associated with the second set of conditional rewards, the second account of the consumer stored in the database, and the second account category of the second account, and determining that the globally unique identifier is stored in the database in association with the first account identifier of the first account of the consumer associated with the first portable consumer device;

subsequent to the second purchase transaction, activating, by the computing apparatus, the second account of the consumer associated with the second portable consumer device and inactivating the first account of the consumer associated with the first portable consumer device, wherein the second account of the consumer associated with the second portable consumer device is valid for purchase transactions conducted using the second portable consumer device based on the computing apparatus activating the second account of the consumer associated with the second portable consumer device and the first account of the consumer associated with the first portable consumer device is invalid for transactions based on the computing apparatus inactivating the first account of the consumer associated with the first portable consumer device;

in response to determining that the second purchase transaction satisfies the second conditional reward within the second set of conditional rewards, transmitting, by the computing apparatus, a notification to the communication device associated with the consumer, the transmitting to provide notice on the communication device associated with the consumer that the second purchase transaction satisfies the second conditional reward, and to enable linking by the communication device associated with the consumer to a website at which the second conditional reward can be redeemed, via a web-enabled session; and in response to detection of a bank identification number received from a transaction terminal of the merchant during processing of the second purchase transaction using the second portable consumer device, activating, by the computing apparatus, processing, by the transaction handler, of the second conditional reward independent of the first subset of conditional rewards, the processing comprising invoking a predetermined computing operation associated with the second conditional reward.

2. The method of claim 1, further comprising receiving, via the communication network, a replacement of a conditional reward in the first subset of conditional rewards with at least one other conditional reward selected by the consumer, wherein thereafter each purchase transaction having transaction information matching the globally unique identifier results in awarding the at least one other conditional reward to the first account of the consumer.

3. The method of claim 1, wherein the globally unique identifier is derived from a predetermined algorithm.

4. The method of claim 1, wherein:
the first portable consumer device has information from which the globally unique identifier can be derived, and the consumer has been issued the first portable consumer device.

5. The method of claim 1, further comprising receiving from the consumer instructions to periodically pay a payment respectively corresponding to a transaction periodically conducted by the consumer with a merchant upon a valid account.

6. The method of claim 1, further comprising receiving a fee corresponding to a notification to the consumer of an occurrence of the first purchase transaction.

7. The method of claim 6, wherein the notification includes instructions for redemption of a conditional reward in the first subset of conditional rewards.

8. The method of claim 1, wherein one or more of the conditional rewards in the first set are derived from a frequency of past purchase transactions within a time period.

9. The method of claim 8, further comprising repeating the deriving of the one or more conditional rewards in the first set to determine a change in the frequency and a corresponding change in the one or more of the conditional rewards.

10. The method of claim 8, further comprising informing the consumer of the one or more conditional rewards in the first set.

11. The method of claim 8, wherein the deriving of the one or more conditional rewards in the first set is performed by associating, for each of the one or more conditional rewards, a discount for a future purchase of a good or service previously purchased in one of the past purchase transactions.

12. The method of claim 1, further comprising sending a notice to the consumer including a description of a conditional reward in the first subset of conditional rewards.

13. The method of claim 1, wherein the second account category belongs to a category of portable consumer device accounts issued to consumers by an issuer.

14. A system, comprising:
a database configured to store a globally unique identifier associated with a first account of a consumer and a first subset of conditional awards selected by the consumer from a first set of conditional rewards derived based on a transaction history of the consumer, the first set associated with a first account category for the account; and a computing apparatus configured to:
send, to a communications device associated with the consumer, the first set of conditional rewards;
receive, via a communication network, first transaction information regarding a first purchase transaction between the consumer and a merchant conducted on the first account of the consumer using a first portable consumer device, wherein the first transaction information regarding a first purchase transaction includes the globally unique identifier associated with the first subset of conditional rewards and the first account of the consumer;
after receiving the first transaction information, accessing the database;
determine, using the globally unique identifier, that the first purchase transaction satisfies a first conditional reward within the first subset of conditional rewards based on accessing the database, wherein when determining that the first purchase transaction satisfies the first conditional reward within the first subset of conditional rewards, the computing apparatus is configured to:
  determine that the globally unique identifier included in the first transaction information regarding the first purchase transaction matches the globally unique identifier associated with the first subset of conditional rewards and the first account of the consumer stored in the database;
  override processing of the first purchase transaction at a level of a bank identification number based on a trigger, the overriding comprising processing the first purchase transaction based on the first conditional reward within the first subset of conditional rewards;
automatically change an association of the globally unique identifier from the first account category of the first account of the consumer to a second account category of a second account of the consumer based on an analysis of past purchase transactions, accessed via the database, wherein the analysis of the past purchase transactions is performed based on transaction information regarding the past purchase transactions conducted on the first account of the consumer;
in response to changing the association of the globally unique identifier from the first account category of the first account of the consumer, automatically send, to the communication device associated with the consumer, a second set of conditional rewards derived based on a frequency of the past purchase transactions conducted on the first account of the consumer within a time period for a type of inventory from the merchant, wherein the second set of conditional awards is associated with the second account category, and each of the second set of conditional rewards representing a value to be credited to the consumer upon a satisfaction of a condition for a future purchase transaction between the consumer and the merchant, wherein the future purchase transaction is to be for the type of inventory;
store, in the database, the globally unique identifier associated with the second set of conditional rewards, the second account of the consumer, and the second account category of the second account;
receive a second subset of conditional rewards selected by the consumer from the second set of conditional rewards;
after receiving second transaction information regarding a second purchase transaction between the consumer and the merchant conducted by the first portable consumer device, use the globally unique identifier to determine that the second purchase transaction satisfies a second conditional reward within the second subset;
store, in the database, an association between the globally unique identifier, a first account identifier of the first account of the consumer associated with the first portable consumer device, and a second account identifier of the second account of the consumer associated with a second portable consumer device;
receive, via the communication network, second transaction information regarding a second purchase transaction between the consumer and the merchant conducted using the first portable consumer device, wherein the second transaction information regarding the second purchase transaction includes the globally unique identifier;
after receiving the second transaction information, access the database;
determine, using the globally unique identifier, that the second purchase transaction satisfies a second conditional reward within the second subset of conditional rewards based on accessing the database, wherein when determining that the second purchase transaction satisfies the second conditional reward within the second subset of conditional rewards, the computing apparatus is configured to:
  determine that the globally unique identifier included in the second transaction information regarding the second purchase transaction matches the globally unique identifier associated with the second subset of conditional rewards, the second account of the consumer stored in the database, and the second account category of the second account, and
  determine that the globally unique identifier is stored in the database in association with the first account identifier of the first account of the consumer associated with the first portable consumer device;
subsequent to the second purchase transaction, activate the second account of the consumer associated with the second portable consumer device and inactivate first account of the consumer associated with the first portable consumer device, wherein the second account of the consumer associated with the second portable consumer device is valid for purchase transactions conducted using the second portable consumer device based on the computing apparatus activating the second account of the consumer associated with the second portable consumer device and the first account of the consumer associated with the first portable consumer device is invalid for transactions based on the computing apparatus inactivating the first account of the consumer associated with the first portable consumer device; and
in response to satisfaction of a third conditional reward within the second subset, transmit a notification to the second portable consumer device, the transmitting to provide notice on the second portable consumer device that the third conditional reward has been satisfied, and to enable linking by the second portable consumer device to a website at which the third conditional reward can be redeemed, via a web-enabled session, using the second portable consumer device.

15. The system of claim 14, wherein the computing apparatus is further configured to award a conditional reward in the first subset to the account of the consumer.

16. A non-transitory machine-readable medium, having stored thereon instructions, which instructions, when executed by a system, cause the system to:
  send, to a communications device associated with a consumer, a first set of conditional rewards derived based on a transaction history of the consumer, the first set of conditional awards associated with a first account category for a first account of the consumer;
  receive a first subset of conditional awards selected by the consumer from the first set of conditional rewards;
  store, in a database, a globally unique identifier associated with the first subset of conditional awards, the first account of the consumer, and the first account category of the first account;

set a trigger to change processing by a transaction handler from processing a conditional reward for a purchase transaction at a level of processing based on a bank identification number to processing a conditional reward for a purchase transaction based on the first set of conditional rewards;

receive, via a communication network, first transaction information regarding a first purchase transaction between the consumer and a merchant conducted on the first account of the consumer using a first portable consumer device, wherein the first transaction information regarding a first purchase transaction includes the globally unique identifier associated with the first subset of conditional rewards and the first account of the consumer;

after receiving the first transaction information, accessing the database;

determine, using the globally unique identifier, that the first purchase transaction satisfies a first conditional reward within the first subset of conditional rewards based on accessing the database, wherein determining that the first purchase transaction satisfies the first conditional reward within the first subset of conditional rewards comprises:
  determining that the globally unique identifier included in the first transaction information regarding the first purchase transaction matches the globally unique identifier associated with the first subset of conditional rewards and the first account of the consumer stored in the database;

override processing of the first purchase transaction at the level of the bank identification number based on the trigger, the overriding comprising processing the first purchase transaction based on the first conditional reward within the first subset of conditional rewards;

automatically change, in the database, an association of the globally unique identifier from the first account category of the first account of the consumer to a second account category of a second account of the consumer based on an analysis of past purchase transactions, accessed via the database, wherein the analysis of the past purchase transactions is performed based on transaction information regarding the past purchase transactions conducted on the first account of the consumer;

in response to changing the association of the globally unique identifier from the first account category of the first account, automatically send, to the communication device associated with the consumer, a second set of conditional rewards derived based on a frequency of the past purchase transactions conducted on the first account of the consumer within a time period for a type of inventory from the merchant, wherein the second set of conditional awards is associated with the second account category, and each of the second set of conditional rewards representing a value to be credited to the consumer upon a satisfaction of a condition for a future purchase transaction between the consumer and the merchant, wherein the future purchase transaction is to be for the type of inventory;

receive a second subset selected by the consumer from the second set of conditional rewards;

after receiving second transaction information regarding a second purchase transaction between the consumer and the merchant conducted by the first portable consumer device, use the globally unique identifier to determine that the second purchase transaction satisfies a second conditional reward within the second subset;

store, in the database, the globally unique identifier associated with the second subset of conditional rewards, the second account of the consumer, and the second account category of the second account;

store, in the database, an association between the globally unique identifier, a first account identifier of the first account of the consumer associated with the first portable consumer device, and a second account identifier of the second account of the consumer associated with a second portable consumer device;

receive, via the communication network, second transaction information regarding a second purchase transaction between the consumer and the merchant conducted using the first portable consumer device, wherein the second transaction information regarding the second purchase transaction includes the globally unique identifier;

after receiving the second transaction information, access the database;

determine, using the globally unique identifier, that the second purchase transaction satisfies a second conditional reward within the second subset of conditional rewards based on accessing the database, wherein determining that the second purchase transaction satisfies the second conditional reward within the second subset of conditional rewards comprises:
  determining that the globally unique identifier included in the second transaction information regarding the second purchase transaction matches the globally unique identifier associated with the second subset of conditional rewards, the second account of the consumer stored in the database, and the second account category of the second account, and
  determining that the globally unique identifier is stored in the database in association with the first account identifier of the first account of the consumer associated with the first portable consumer device;

subsequent to the second purchase transaction, activate the second account of the consumer associated with the second portable consumer device and inactivate first account of the consumer associated with the first portable consumer device, wherein the second account of the consumer associated with the second portable consumer device is valid for purchase transactions conducted using the second portable consumer device based on a computing apparatus activating the second account of the consumer associated with the second portable consumer device and the first account of the consumer associated with the first portable consumer device is invalid for transactions based on the computing apparatus inactivating the first account of the consumer associated with the first portable consumer device; and in response to determining that the second purchase transaction satisfies the second conditional reward within the second subset of conditional rewards, transmit a notification to the communication device associated with the consumer, the transmitting to provide notice on the communication device associated with the consumer that the second purchase transaction satisfies the second conditional reward, and to enable linking by the communication device associated with the consumer to a website at which the second conditional reward can be redeemed, via a web-enabled session.

17. The non-transitory machine-readable medium of claim 16, wherein the first account category belongs to a category of portable consumer device accounts issued to consumers by an issuer.

18. The non-transitory machine-readable medium of claim 17, wherein the instructions further cause the system to award a conditional reward within the first subset to the account of the consumer.

\* \* \* \* \*